UNITED STATES PATENT OFFICE.

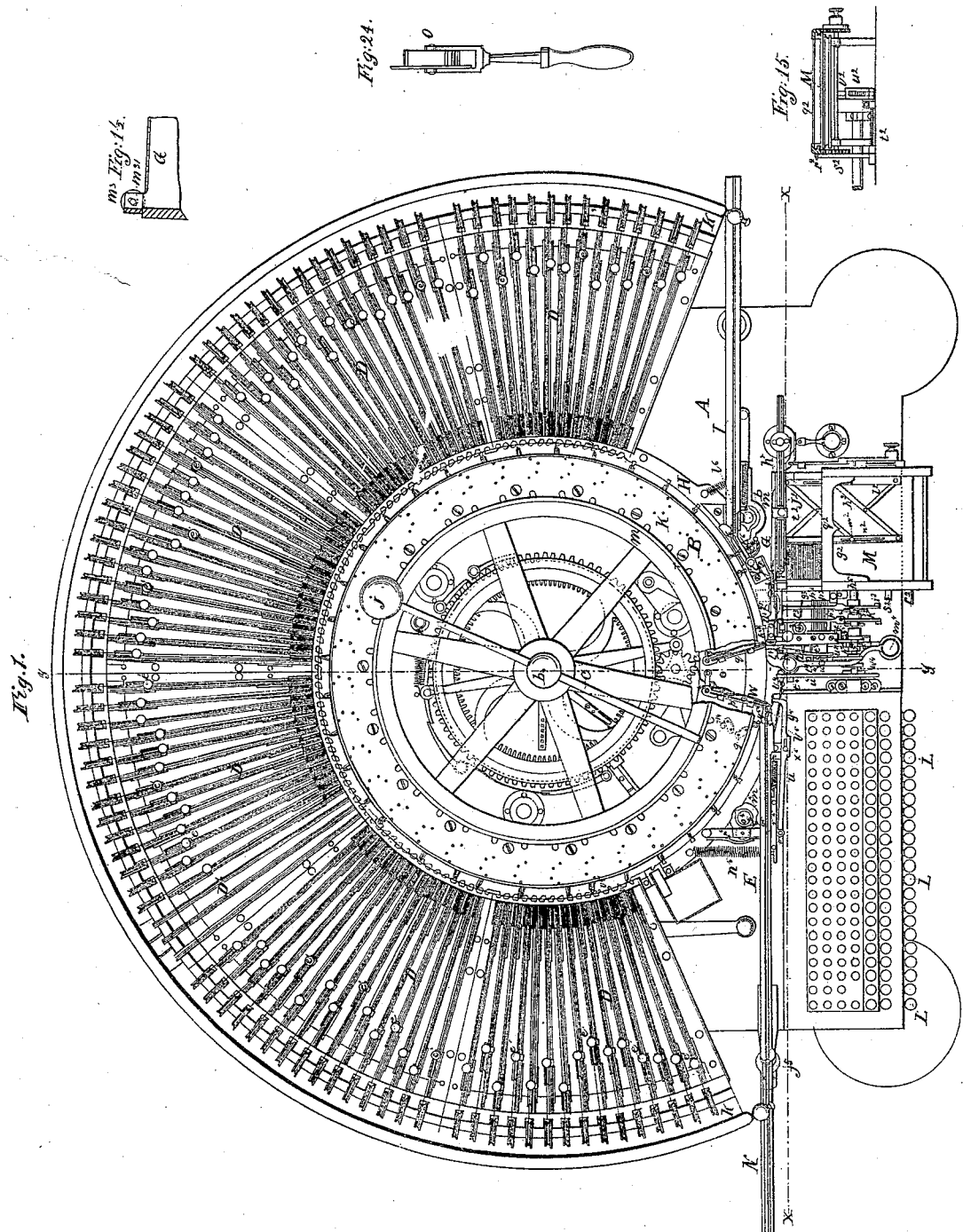

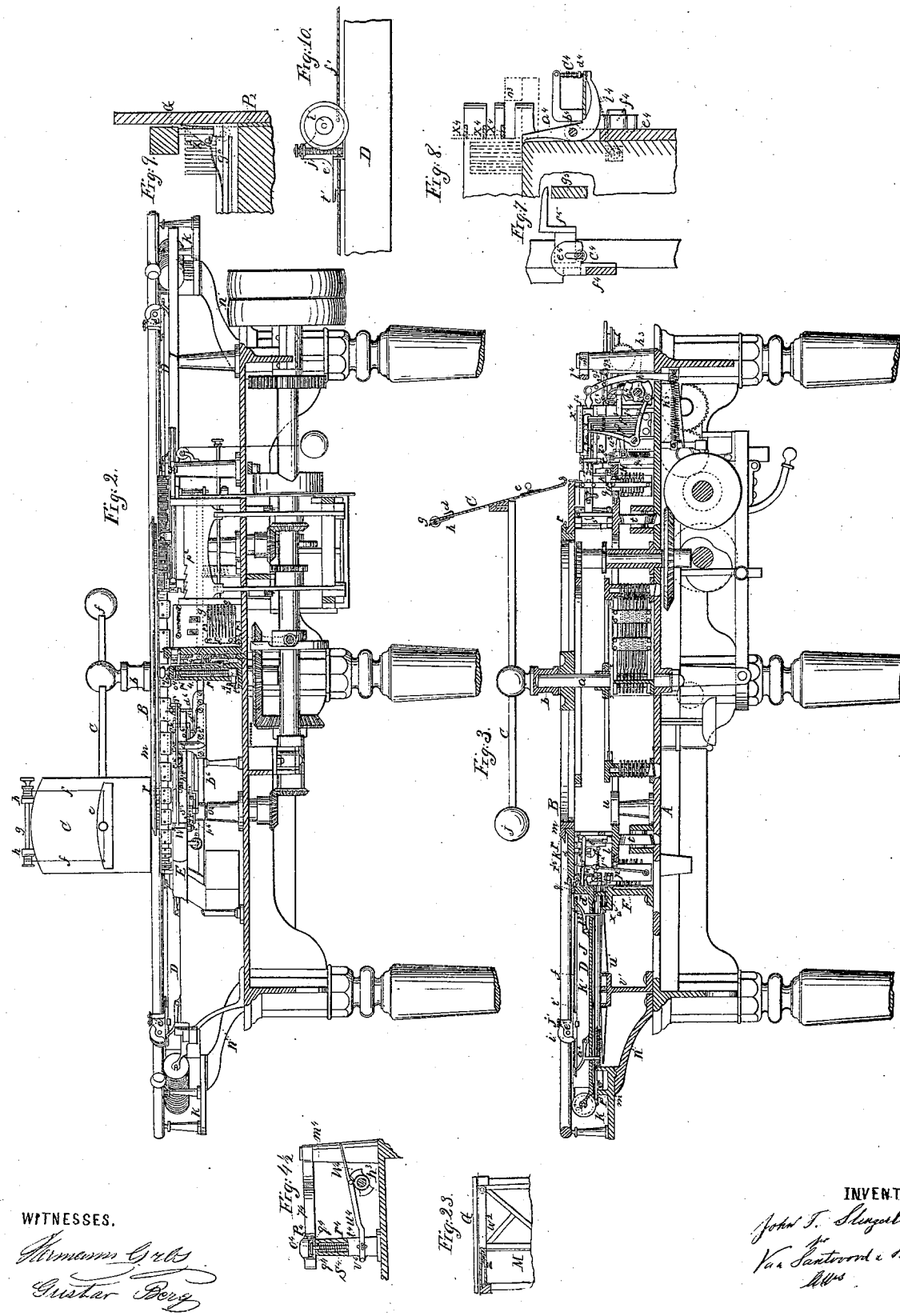

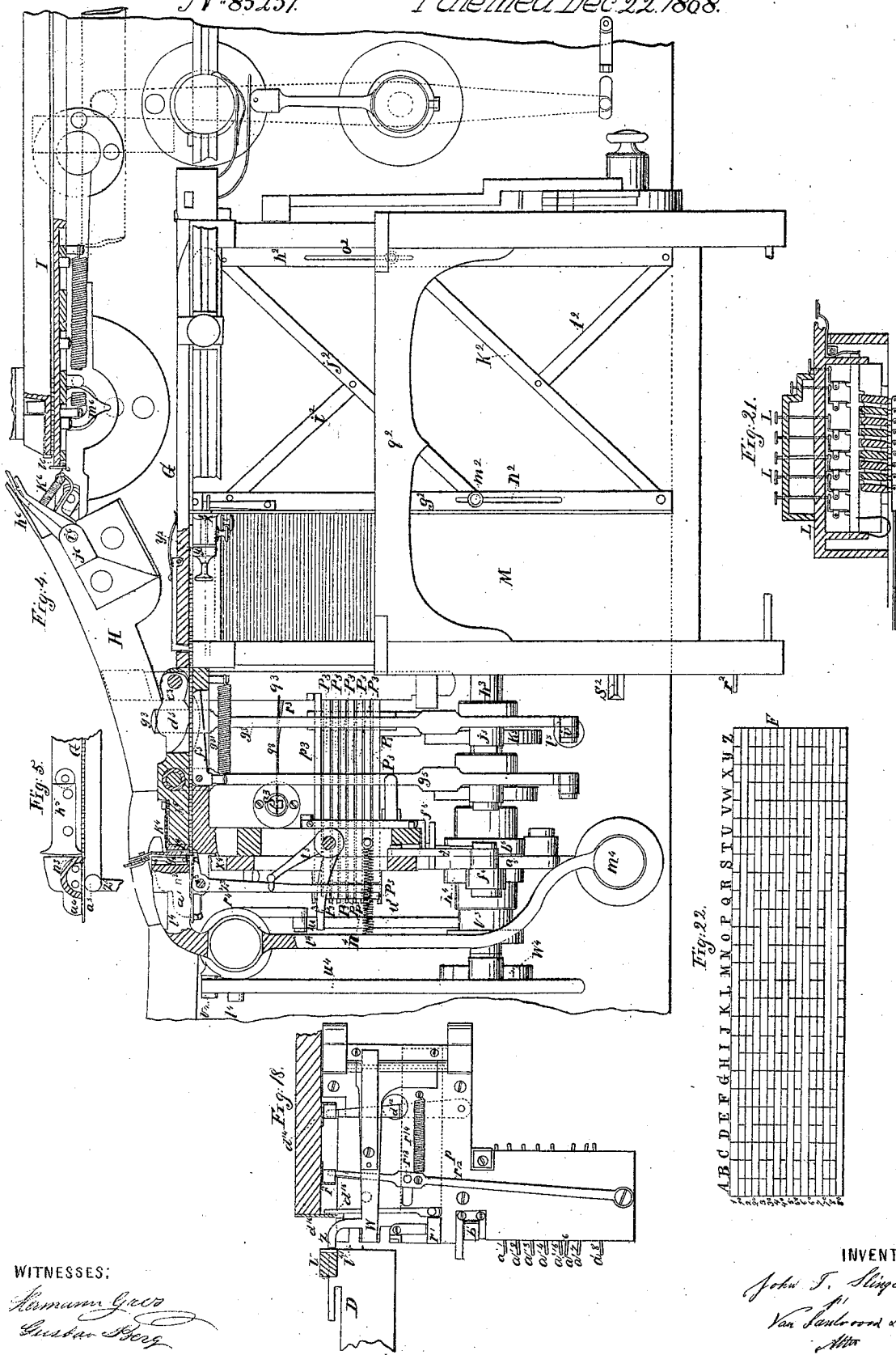

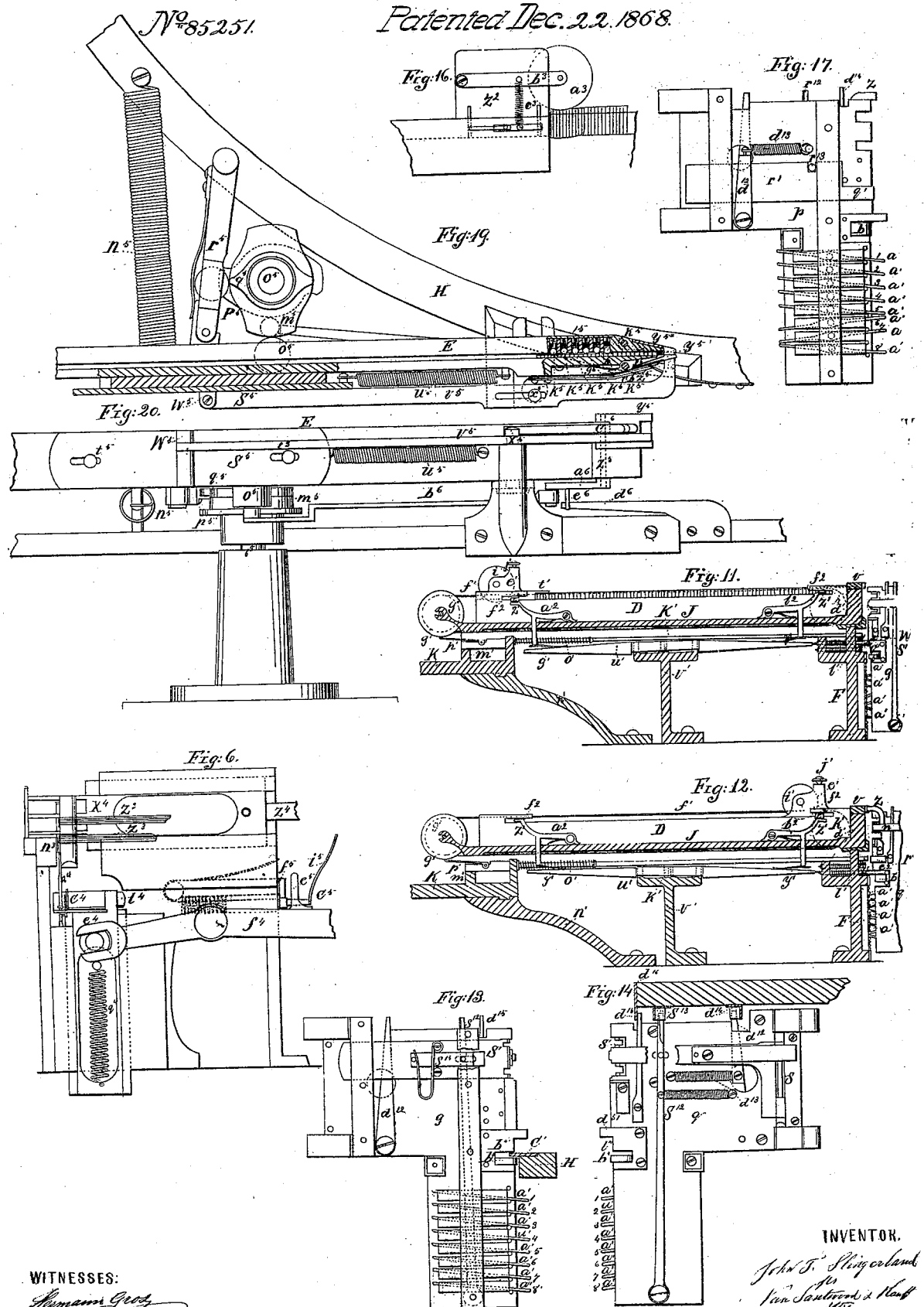

JOHN T. SLINGERLAND, OF NEW YORK, N. Y., ASSIGNOR TO ALDEN TYPE SETTING AND DISTRIBUTING MACHINE COMPANY, OF SAME PLACE.

IMPROVEMENT IN TYPE SETTING AND DISTRIBUTING MACHINES.

Specification forming part of Letters Patent No. 85,251, dated December 22, 1868.

*To all whom it may concern:*

Be it known that I, JOHN T. SLINGERLAND, of Eighth street, corner Avenue A, New York, have invented a new and useful Improvement in Machines for Setting and Distributing Type; and I do hereby declare that the following is a full, clear, and exact description thereof, which will enable those skilled in the art to make and use the same, reference being had to the accompanying drawings, forming part of this specification, in which drawings—

Figure 1 represents a plan or top view of this invention. Fig. 1½ is a detached view of the adjustable roller for leveling the types in the distributing type-channel. Fig. 2 is a longitudinal vertical section of this invention, the line $xx$, Fig. 1, indicating the plane of section. Fig. 3 is a transverse section of the same, taken in the plane indicated by the line $yy$, Fig. 1. Fig. 4 is a detached sectional plan of the distributer and adjacent parts in a larger scale than the previous figures. Fig. 4½ is a detached sectional view of the gate of the distributer. Fig. 5 is a detached sectional plan of the abutment upon which one type after the other is raised during the operation of distributing the same. Fig. 6 is a side elevation of the mechanism for lifting the type. Fig. 7 is a sectional front elevation of the "governor." Fig. 8 is an inside elevation of the lifter. Fig. 9 is a transverse section of the movable floor, showing the "latch", which prevents the end types in the line which is being lifted from tumbling over or otherwise losing their proper position. Fig. 10 is a detached elevation of the mechanism for adjusting the cords on the radiating type-cases. Figs. 11 and 12 are sectional views of the radiating type-cases and the mechanism connected therewith. Figs. 13 and 14 are detached views of the distributing-conveyer. Fig. 15, Sheet I, is a detached sectional view of the alarm on the distributing-galley. Fig. 16 is a detached elevation of the shield and revolving breaker on the distributing-galley. Figs. 17 and 18 are detached views of the setting-conveyer. Fig. 19 is a sectional plan of the composition-channel. Fig. 20 is a front elevation of the same. Fig. 21 is a transverse section of the key-board. Fig. 22 is an inside elevation of a portion of the excavated ring, showing the system of excavations for a whole alphabet. Fig. 23, Sheet II, is a sectional plan of the distributing-channel, showing the latch over the galley-table. Fig. 24, Sheet I, is a detached view of the tool for leveling the line of type in the transfer-channel.

Similar letters indicate corresponding parts.

This invention relates to certain improvements in that class of machines for setting and distributing type on which Letters Patent have been granted to Timothy Alden, September 15, 1857, and to Henry W. Alden and William Mackey, January 23, 1866.

The principal working parts of this machine consist of a revolving carrier-wheel having attached to its rim a series of conveyers. These conveyers are capable of receiving a set or indication, and one-half of the same are for setting, and they take the types from a series of radiating type-cases and deliver them into the composition-channel, their set being produced by the action of the operator upon a series of keys. The other half of the conveyers are for distributing, and they take the types from the distributing-channel and deliver them in their appropriate cases, the set being produced automatically by a series of levers acting upon nicks in the edge of the type.

The improvements which form the subject-matter of this present application relate principally to the distributer, which is so constructed that it will allow of distributing type of an ordinary font without regard to thickness, while heretofore the machine was confined to type cast expressly for this purpose and divided according to their thickness into thirteen different classes, and consequently such fonts only could be distributed by the machine.

The invention also relates to the arrangement of a manuscript-supporter on the central arbor of the carrier-wheel; also, to certain improvements in the construction and operation of the conveyers; also, to certain improvements in the carrier-wheel and in the radiating type-cases, and in the mechanism connected therewith; also, to the arrangement of a gallery under the outer ends of the radiating type-cases; further, to the peculiar arrangement of the surplus-channel; further, to improvements in the mechanism for separating and supporting the type in the distributing-channel and on the distributing table or galley; also, to an alarm attachment, in combination with the distributing-galley; finally, to certain improvements in the construction and operation of the composition-channel and of a transfer-channel which forms an extension of said composition-channel.

A represents the bed of my machine, which is made in the form of a horseshoe or segment of a circle, and which supports the working parts of the mechanism. From the center of this bed rises a stationary arbor, $a$, Fig. 3, which forms the guide for the carrier-wheel B, and which extends above said carrier-wheel, so as to be capable of receiving a cap, $b$. This cap turns freely on the arbor $a$, and it is provided with a transverse socket to admit a rod, $c$, which carries the manuscript-supporter C, its end being turned up and made to fit into a socket formed in a block that is secured to the back of said manuscript-supporter, and which is so formed that the supporter will be held in a reclining position, as shown particularly in Fig. 3 of the drawings. The manuscript is secured to the supporter by pointed hooks $d$, and the bottom edge of said supporter is curled up so as to receive a lead-pencil or other instrument for marking the place on manuscript when stopping. A rule, $e$, which is suspended from cords $f$, serves the double purpose of holding the manuscript close up to its supporter and also of indicating the line to be set. The cords $f$ are secured to a shaft, $g$, which has its bearings in arms $h$, attached to the back of the supporter, and said shaft is subjected to the action of friction-springs, so that it will be prevented from turning spontaneously. By turning this shaft the operator is enabled to raise and lower the rule and to adjust it in the desired position. The supporter turns on its supporting-pin at the end of the rod $c$, and said rod turns with the cap $b$, so that the supporter can be readily adjusted in the required position. A weight, $j$, counterbalances the supporter.

The carrier-wheel B is constructed of three principal parts—viz., the upper rim, $k$, the lower rim, $l$, and the central flanged ring, $m$, with its arms and hub. The rims $k$ and $l$ are connected by upright posts, and they form the guides for the connecting-pins $s$ and the bearings for the fulcrum-pin $o$ of the conveyers $p$ $q$. The ring $m$ is secured to the upper rim by means of a series of screws, and it is provided with a flange, $r$, which projects over the pins of the conveyers and prevents the same from rising up out of the guide slots or sockets. The object of making the ring $m$ detachable from the rim $k$ is to obtain ready access to the interior of the carrier-wheel, since the carrier-wheel itself cannot be raised out of the central arbor until all the conveyers have been taken off, which occasions much loss of time, while the ring $m$ can be removed and reattached with little trouble. The carrier-wheel rides upon three or more wheels, $t$, and it is steadied by a series of friction-rollers, $u$, which bear on the inner edge of the lower rim, $l$, as shown in Fig. 3.

The conveyers $p$ $q$ are divided in two classes, those marked $p$ being for setting, and those marked $q$ for distributing, and they alternate with each other, so that if the carrier-wheel contains thirty-six conveyers there will be eighteen for setting and eighteen for distributing. Each conveyer is constructed of two parts, which are hinged together by the connecting-pins $s$, so that they can assume a double motion—viz., one in the direction toward and from the center of the carrier-wheel and one in the direction of the circumference of said carrier-wheel. The object of the first or radial motion of the conveyers is to enable them to approach the places where they have to take or deliver a type, and the object of the second or circumferential motion is to enable them to stop during the time they take or deliver a type while the carrier-wheel continues to move with a uniform velocity. These motions will be readily understood by referring to Fig. 1 of the drawings, where two conveyers are shown in section. In making their radial motion the conveyers swing on the pivots $o$, and in making their tangential motion they swing on the pivots $s$.

The setting-conveyers $p$ take types from the radiating type-cases D, and deliver them in the composition-channel E, the type being pushed out of the type-cases by suitable mechanism, which will be hereinafter described, into the gripper of the conveyer. This gripper consists of a spring-jaw, $w$, which is secured to the conveyer, as shown in Fig. 18, and from this spring-jaw rises a hook, $z$, which, whenever the conveyer falls in, catches into the cavities of a serrated rail, $v$, that is secured above the type-cases, as seen in Figs. 1, and 3, 11, and 12, and by these means the gripping-jaw is forced open and the type is admitted. As soon as the conveyer recedes the hook $z$ clears the serrated rail and the gripper retains the type. If the conveyer is not allowed to fall in or to move outward in a radial direction, which motion depends upon the set of the indicator-points $a'$ and the excavations in the excavated ring F, the hook $z$ clears the serrated rail and the gripper remains closed.

The distributing-conveyers $q$ take their type from the distributing-channel G and deliver it into the appropriate case D, according to the set given to the indicator-points $a'$ on said conveyers and the excavations in the excavated ring F. This excavated ring is situated under the inner ends of the type-cases; but it does not extend all the way round, about one-third thereof being cut away and replaced by a segmental rail, H, as clearly shown in Fig. 1 of the drawings. This rail is so situated in relation to the carrier-wheel and the conveyers attached thereto that the distributing-conveyers are enabled to stop at the mouth of the surplus-channel I and at that of the distributing-channel G and the setting-conveyers at the mouth of the composition-channel E.

In order to reduce the friction between the conveyers and the rail as said conveyers sweep round the inner edge of the rail, friction-rollers $b^*$ $b'$ are provided, which are secured in the conveyers, as shown in Figs. 13 and 14 and 17 and 18. It will be noticed that the friction-rollers $b^*$ of the distributing-conveyers are lower than the rollers $b'$ in the setting-conveyers, a space, $b^{*\prime}$, being left above the rollers in the distributing-conveyers, as clearly shown in Figs. 13 and 14. The object of this arrangement is to prevent the setting-conveyers from stopping at the mouth of the distributing-channel, a cam, $c'$, being secured to the top of the rail H in such a position that it strikes the rollers $b'$ of the setting-conveyers and forces said conveyers back as they pass the mouth of the distributing-channel, while said cam will not come in contact with the rollers $b^*$ of the distributing-conveyers, but pass through the space $b^{*\prime}$ in said conveyers, as indicated in Figs. 3 and 13. On the inner ends of those side plates of the cases which the conveyers pass on retreating from said cases are projections $v^{41}$, (see Fig. 1,) which guide the types on being pushed out of a distributing-conveyer into a type-case and compel the type to enter the case-channel, and thus the operation of delivering the type is rendered correct and unfailing. The indicator-points $a'$ are the ends of levers which are secured to the conveyers and subjected to the action of friction-springs, so that they will retain any position into which they may be brought. These indicator-points slide in the grooves of the excavated ring F, and if they arrive opposite a space where the grooves in which they slide are deepened or open the conveyer is permitted to "fall in" and to take a type from or deliver it to the type-case. A system of these excavations is shown in Fig. 22, where it will be seen that the ring F has sixteen grooves, while the number of indicator-points on each conveyer is only eight, each indicator-point being so arranged that it can be brought opposite to either of two adjoining grooves. If the grooves in the excavated ring are designated by 1 1°, 2 2°, 3 3°, &c., then the first indicator-point can be made to slide either in the groove 1 or in the groove 1°, the second in the grooves 2 2°, &c., and if for the letter A, for instance, the grooves 1 2 3° 4° 5 6 7 8° are deepened or open, and a conveyer passes having its indicator-points set so that the point 1 will slide in groove 1, the point 2 in groove 2, the point 3 in groove 3°, the point 4 in groove 4°, the point 5 in groove 5, the point 6 in groove 6, the point 7 in groove 7, and the point 8 in groove 8°, then this conveyer will be allowed to fall in and deliver its type into the channel over said spot in the excavated ring or take a type from said channel.

Each conveyer is provided with a lever, $d^{12}$, which projects up close under the carrier-wheel, and which is carried forward by the action of a spring, $d^{13}$. Whenever the conveyer stops to receive or deliver a type the upper end of the lever $d^{12}$ strikes an inclined cam, $d^{14}$, at the under surface of the carrier-wheel, (see Fig. 18,) and by the action of this cam the lever is forced back against the action of its spring. While the conveyer stops it is prevented from falling back by the projection $d^{15}$ catching against the lip $d^{16}$ on the rim of the carrier-wheel; but as soon as said projection has passed the lip the conveyer is carried back by the action of the lever $d^{12}$ and spring $d^{13}$, and the indicator-points are extricated from the perforations of the ring F. The set is given to the indicator-points of the setting-conveyers by the action of the operator on the keys L, and to those of the distributing-conveyers automatically by the distributing mechanism, which will be hereinafter more fully described.

The type-cases D are mounted on the foundation-plate J, which is cast solid with a raised rim, $d'$, and this rim is provided with a series of slots to receive and support the type-cases. By these means the discharging or receiving ends of said type-cases are firmly retained in position, and they are not liable to work loose or become displaced. The foundation-plate J is supported at its inner edge by a flanged rim, $l'$, which rises from the back of the excavated ring, and at its outer edge by a rim, $m'$, which rises from the gallery K. This gallery rests upon curved arms $n'$, which rise from the bed A, and it extends all round under the ends of the type-cases, giving room to arrange types, which, upon extraordinary occasions, are to be introduced into said channels by hand. In each type-case works a pusher, $e'$, from which extends a cord, $f'$, round pulleys $g'$ $h'$ at the ends of the case or channel. (See Figs. 11 and 12.) One end of this cord is secured to the pusher and its other end to a pulley, $i'$, which turns on an arbor or pin secured in the pusher, and which is made in the form of a worm-wheel, that engages with the endless screw $j'$. By turning this screw, therefore, the cord $f'$ can be tightened with great ease. (See Fig. 10.)

Under each type-case extends a rod, $k'$, which is supported at one end by the flanged rim $l$ and its opposite or outer end by the rim $m'$, and which is subjected to the action of a spring, $o'$, that forces the same in toward the center of the carrier-wheel, causing its inner end to project beyond the rim $l'$.

To the outer end of the rod $k'$ is secured a pawl, $p'$, which engages with a ratchet-wheel, $q'$, fastened to the pulley $g'$ at the outer end of the type-case. On each setting-conveyer is a pusher, $r'$, which is connected to and operated by a lever, $r^{12}$, which connects with said pusher by a pivot, $r^{13}$, (see Fig. 18,) and which is subjected to the action of a spring, $r^{14}$, that pulls the same, together with the pusher, back to the position shown in Fig. 18. When the conveyer stops to receive a type the upper end of the lever $r^{12}$ strikes a cam, $r^{15}$, at the under side of the carrier-wheel, and by the action of this cam said lever, together with the pusher, is caused to move out, and the end of the pusher $r'$ is caused to bear against the inner end of the rod $k'$, causing the pawl $p'$ to engage the ratchet-wheel $q'$, thereby propelling the type-case pusher $e'$ in the direction toward the center of the carrier-wheel, and pushing a type out of the type case or channel into the gripper of the conveyer.

The distributing-conveyers do not act on the rod $k'$; but they are provided with pushers $s'$, (see Fig. 13,) which are actuated by levers $s^{12}$ and by cams $s^{13}$ on the carrier-wheel, and which serve to push the type out of said conveyers into the type-cases, said levers $s^{12}$ being actuated by the cams $s^{13}$ when the distributer stops to discharge a type. If a new type is pushed into a case, the line of type contained therein is forced back and the pusher $e'$ is compelled to recede. The connection between the lever $s^{12}$ and the pusher $s'$ is effected by a safety-spring, $s^{15}$, which is enabled to give in case said pusher meets with an undue resistance, and injury to the working parts is avoided. During these operations of receiving type in or discharging it from the type-cases the line of type is either forced against the pusher or the pusher against the line, and the type or types next to said pusher are liable to work up in the case or channel and to lose their correct position. This difficulty is avoided by constructing the pusher $e'$ with a lip, $t'$, which projects over the type or types nearest to it, and prevents the same from working up.

Provision is also made in this machine to prevent a distributing-conveyer stopping at a type-case which is already full, or a setting-conveyer from stopping at one which is empty. The mechanism used for effecting this purpose is different from that heretofore used and described in the patents mentioned at the beginning of this specification, and it is constructed as follows, (see Figs. 11 and 12:)

Under each type-case is situated a tilting lever, $u'$, which is guided by a pivot secured in a segmental standard, $v'$, and which lever is made to vibrate upon two different fulcra, one on each side of said pivot, so that its inner end can be placed behind either of the pins $w'$ $x'$, which are supported by the flanged rim $l$, and which are subjected to the action of springs, so that they are allowed to yield to a pressure from the inside, while the springs have a tendency to carry them back to their original position as soon as this pressure ceases to act.

To the ends of the tilting lever $u'$ are secured two springs, $y'$, which are directly under the descending arms of the bell-crank levers $a^2$ $b^2$. These levers are pivoted to the sides of the type-cases near their opposite ends, and they are provided with projections $z'$, which rise to such a position that a stud, $c^2$, which extends from the side of the pusher $e'$ will come in contact with the same whenever said pusher approaches either end of its type-case. If the case is full, as shown in Fig. 11, the stud $c^2$ bears on the projection $z'$ of the bell-crank lever $a^2$ and depresses the same, and by this action the tilting lever $u'$ is turned upon its outer fulcrum and brought in such a position that its inner end stands close behind the pin $w'$. If a distributing-conveyer $q$ comes along carrying a type which could go into this case, said conveyer is prevented from falling in by a projection, $d^2$, which strikes the end of the pin $w'$. If the case is not full, and the tilting lever $u'$ in its central or zero position opposite to neither of the pins $w'$ $x'$, the pin $w'$ yields under the pressure of the distributing-conveyer and said conveyer is permitted to fall in. If the case is empty, the pusher has arrived in the position shown in Fig. 12, and the stud $c^2$ depresses the bell-crank lever $b^2$. The tilting lever $u'$ is thereby turned upon its inner fulcrum, and is in such a position that its inner end is opposite the pin $x'$; and if a setting-conveyer $p$ comes along, the set of which would enable it to stop before this case, it is prevented from falling in by the projection $e^2$ on the conveyer striking the end of the pin $x'$. If the case is not empty, and the tilting lever $u'$ occupies its central or zero position between the outer ends of the pins $w'$ $x'$, the pin $x'$ can yield under the pressure of the projection $e^2$ of the setting-conveyer, and said conveyer is enabled to fall in and take a type from the case. By providing the levers $u'$ with two fulcra they are enabled to find their zero position to a nicety by their own inertia, and without requiring any additional piece to return them to this position. It will be noticed that the stud $c^2$, which heretofore was secured to the cord $f'$, is now attached to the pusher itself, and by these means its action is rendered more certain, since its position in relation to the pusher cannot change. As the stud $c^2$ comes in contact with either of the bell-crank levers $a^2$ $b^2$ the pusher would have a tendency to rise up out of the case. This tendency is counteracted by lips $f^2$ on the case, which overlap the stud $c^2$ as soon as the same strikes the bell-crank levers, and consequently the pusher is not permitted to rise in the case.

Some of the radiating type-cases D* extend clear across the foundation-plate J, and they carry no pusher, being intended merely to receive certain characters—such as quadrats, hyphens, en-quads, &c.—which are distributed and set by the machine, and which have also to be set into the line by hand. Under the outer ends of these surplus-channels $D^2$ are holes in the gallery K, and suitable boxes placed under these holes receive the characters forced out of said cases, so that the justifier can readily reach them as he requires the same for justification or otherwise. Each of these surplus-channels has duplicates, which are provided with pushers $u$, so that the machine always keeps a supply in said duplicate channels, and the operator can set them by machine as well as other characters.

The mechanism for distributing the type is shown particularly in Figs. 1 to 9, inclusive.

The "dead matter" to be distributed is placed, column after column, on the galley-table M, which is provided with an adjustable column-gage, $g^2$. This column-gage is connected to the rim $h^2$ of the galley-table by two sets of parallel rods, $i^2 j^2$, $k^2 l^2$. (Best seen in Figs. 1 and 4.) The rod $j^2$ is pivoted to the rim $h^2$, and it connects to the gage $g^2$ by a set-screw, $m^2$, which moves in a slot, $n^2$, while the rod $i^2$ connects to the gage and to the rod $j^2$ by means of pivots. The rod $k^3$ is pivoted to the gage $g^2$, and it connects with the rim $h^2$ by a set-screw, $m^2$, moving in a slot, $o^2$, while the rod $l^2$ is connected by pivots to the rod $k^2$ and to the rim. By releasing the set-screws $m^2$ the column-gage can be adjusted, and while being adjusted it always retains a position parallel to the rim $h^2$, and at the same time the inner end of said gage remains close to the inner edge of the galley-table, so that it does not interfere with the motion of the movable floor $p^2$. Neither does it leave room for any type to pass between it and said floor. The galley M is situated on the side of the distributing-channel G, and the movable floor $p^2$ (see Fig. 2) is so situated that the same when it is up forms a continuation of the bottom of the distributing-channel, and when it is down it allows of pushing the first line of type from the galley-table over it, its thickness being just equal to the width of the type. As the movable floor rises it carries the line of type up into the distributing-channel. The top edge of the movable floor is serrated, scalloped, or simply inclined, so that the same as it begins to act on the line of type in lifting the same off from the galley-table is not compelled to separate the whole line at once, but acts successively on the types, and thereby the operation of separating the lines from the column is materially facilitated.

The operation of feeding the column up toward the distributing-channel is effected by a slide, $q^2$, which is propelled automatically at the proper intervals by suitable mechanism, and as the last three or four lines of the column are brought up to the distributing-channel a pin, $r^2$, projecting from the side bar of the slide $q^2$ strikes a spring-arm, $s^2$, which is secured to one end of a rock-shaft, $t^2$, (see Fig. 15, Sheet I,) the opposite end of which carries an alarm-click, $u^2$. As the rock-shaft $t^2$ is turned by the action of the pin $r^2$ on the spring-arm $s^2$ the alarm-click $u^2$ is forced up against the circumference of a ratchet-wheel, $v^2$, which is mounted on a revolving shaft and rotates with the same. By the noise thus produced the attention of the operator is called to the fact that his column is about giving out and he has ample time to introduce a fresh column or to stop the operation of the distributing mechanism in due time. When the pin $r^2$ is not in contact with the spring-arm $s^2$ the alarm-click $u^2$ is thrown out of contact with the circumference of the ratchet-wheel $v^2$ by a spring acting on the rock-shaft $t^2$. The lines of type pass from the galley M into the type-channel G under the latch $w^2$, which, when closed, forms a portion of the inner wall of said channel, and which is so constructed that it can be readily opened and closed. (See Fig. 23.) When the latch is open easy access can be had to that portion of the distributing-channel over the movable floor, and any irregularity in the position of the type in the channel can be readily corrected. The latch is locked by a spring-catch or any other suitable fastening which can be operated with little trouble or loss of time. When the movable floor $p$ descends and the column is fed up against that wall of the channel G which is beyond the movable floor the last type or types in the line, after having passed the end of the column-gage $g^2$, are liable to tumble over and create a disturbance. This difficulty is overcome by a spring-latch, $x^2$, (see Fig. 9,) which is secured to the outer end of said column-gage $g^2$, and which is so constructed that it drops forward across the channel G (forming, so to say, a continuation of the column-gage) whenever the movable floor descends, and consequently the types, on being pushed over the movable floor and while being raised by the same, are prevented from tumbling over. As the movable floor rises it forces the spring-latch $x^2$ back, and the types are sustained by the pusher $y^2$, which immediately comes up to feed the line toward the distributing mechanism.

To the rear wall of the distributing-channel is secured an adjustable shield, $z^2$, which is intended to prevent the type being thrown over among the conveyers. This shield is made movable, so that it can be taken off in order to get access to the parts behind, and it is intended to extend throughout the entire width of the galley-table M. A detached view of it is shown in Fig. 16. Near the inner end of this shield, next the distributing mechanism, is situated the revolving breaker $a^3$. It consists of a simple narrow roller, which revolves freely on its axis, and said axis is attached to an arm, $b^3$, which is pivoted to the outer surface of the shield $z^2$, and which is subjected to the action of a spring, $c^3$, (see Fig. 16,) whereby the roller $a^3$ is depressed upon the top of the line of type fed through under it in the channel G. The bottom of this channel at that place which is opposite or under the breaker $a^3$ is slightly concave or depressed, so that each type as it passes under the breaker is capable of being depressed, and thereby its separation from the adjoining types is effected, or at least promoted. After having passed the revolving breaker the line of type is exposed to the action of the lateral vibrating breaker $d^3$. This breaker (best seen in Fig. 4) consists of a curved lever, which has its fulcrum on a pivot, $e^3$, and which is situated in a slot or mortise in the inner wall of the distributing type-channel G. That portion of the wall opposite the breaker $d^3$ is made concave from top to bottom, as indicated by a dotted line in Fig. 4, and in order to prevent the type from dropping into this cavity and producing a disturbance a yielding channel-piece, $f^3$, is introduced, which is made in the form of an elbow-lever and subjected to the action of a spring, $g^{31}$. This spring has a tendency to keep the yielding channel-piece in such a position that its inner surface is flush with the flat surface of the channel-wall; but at the same time said channel-piece is capable of yielding to the pressure of the breaker.

A vibrating motion is imparted to the breaker $d^3$ by means of a bell-crank lever, $g^3$, which has its fulcrum on a pivot secured in a bracket attached to the channel G, and the short arm of which bears on the breaker, while its long arm extends over the cam-shaft $h^3$ and connects by a link, $i^3$, with a spring situated underneath the bed of the machine. By the action of this spring a roller, $j^3$, secured to the long arm of the lever $g^3$ is pulled down toward the cam $k^3$, and as the cam-shaft $h^3$ revolves a vibrating motion is imparted to the bell-crank lever, and through it to the breaker. The throw of the bell-crank lever $g^3$, and consequently that of the breaker, is regulated by a nut, $l^3$, on the link $i^3$. By adjusting this nut the distance to which the roller $j^3$ is permitted to approach the cam-shaft $h^3$ is regulated, and the breaker can be made to act with more or less force. By the combined action of the breaker $d^3$ and of the yielding channel-piece $f^3$ the line of type is alternately forced in and out of the cavities in the wall opposite the breaker, and if any two types still adhere they are separated by this motion, or at least their separation is materially promoted. As the line advances in the type-channel each type has to pass under a roller, $m^3$, Figs. 1 and 1½, which forces the same clear down to the bottom of the type-channel and keeps it in a correct position for the type-levers $z^3$ to act on the nicks in its edge, the line of type being prevented from being pushed out of the type-channel by an abutment, $n^3$. The shaft of the roller $m^3$ is secured in an oblique slot, $m^{31}$, so that it can be adjusted, and the edge of the roller can be set as close as possible to the mouth of the type-channel, leaving just room for the thickest type to be lifted up. As the roller is liable to wear off, it must be adjusted from time to time, and the inclination of the oblique slot is such that on adjusting the roller its periphery retains the required distance from the bottom and from the mouth of the type-channel.

The type-levers $z^3$ perform the same function as those described in the patent of Timothy Alden, and in that of Henry Alden and Wm. Mackey; but their form has been changed and their number has been reduced. I use only eight such levers, whereas in the former machines thirteen were required to correspond to the thirteen different thicknesses of type in a font, said levers serving the double purpose of producing the indication or set of the conveyers and of allowing the channel to open just far enough to make room for the first type in the line. My type-levers have nothing to do with the thickness of the type, and I have therefore been enabled to reduce their number and to simplify the whole mechanism. Said type-levers are made in the form of bell-crank levers, which have their fulcra on a pivot, $o^3$, one being placed right on the top of the other, so that the top one only is visible in Fig. 4, but the whole number can be seen in Figs. 3 and 6. They are arranged in two groups, each group comprising four levers, thereby facilitating the operation of nicking the type.

The short arms of the type-levers $z^3$ are provided with lips, which bear on the nicked edge of the type, and which project beyond the edge of the abutment for a distance equal to or a little less than the thickness of the thinnest type. Their long arms are subjected to the action of the vertical arms of elbow-levers $p^3$, which are forced up against the type-levers by means of springs, each elbow-lever being provided with a separate spring, and being made to correspond to one of the type-levers, which object is obtained by making said type-levers and elbow-levers of different lengths and causing each elbow-lever to act against the end of one of the type-levers, as seen in Fig. 3. By the action of the springs which bear on the elbow-levers the short arms of the type-levers are pressed up against the nicked edges of the type, and those type-levers which are opposite the nicks are allowed to sink in, so that the horizontal arms of the corresponding elbow-levers sink down and catch into notches in the indicator-slides $q^3$. Each of these slides is provided with a second notch to receive the end of a spring, $r^3$, which is attached to a vertical arbor, $s^3$, to which a vibrating motion is imparted at the proper intervals by the driving mechanism of the machine. Those of the slides which are not retained by their elbow-levers are permitted to move; but those which are retained by their elbow-levers (said elbow-levers being allowed to catch in the notches of the slides by the sinking in of their type-levers) are pushed out on the inner side of the type-channel, and produce the requisite set of the distributing-conveyer before the same reaches the mouth of the type-channel. By the time the next setting-conveyer passes the indicator-slides $q^3$ they are already withdrawn, so that they act only on the distributing-conveyers. After the indication has thus been transmitted to the conveyer the type-levers $z^3$ are withdrawn from the nicks by the action of a bell-crank lever, $t^3$, one end of which is of such a shape that it embraces all the type-levers, while its other end is acted on by a crank-lever, $u^3$, to which a vibrating motion is imparted by a cam, $v^3$. This cam is mounted on the shaft $h^3$, and it is so timed that it acts on the crank-lever $u^3$ immediately after the indication has been transmitted to the conveyer.

If it is desired to stop the operation of distributing while the operation of setting progresses, a latch, $u^{31}$, is turned down over the end of the vertical arm of the bell-crank lever $u^3$, and as this latch catches said lever and holds it back the type-levers $z^3$ are prevented from coming in contact with the edge of the type, thus saving the type from injury or wear. When the operation of distributing is to be resumed the lever $u^3$ is released, and the type-levers $z^3$ proceed to act as heretofore described. As soon as the type-levers are thrown back from the edge of the type by action of the cam $v^3$ and levers $u^3$ $t^3$ said type is raised by the lifter $a^4$ to such a height that the pressure on the line of type will force the same over the abutment $n^3$, while the next succeeding type in the line is brought up against said abutment.

The abutment and lifter will be best understood by referring to Figs. 5, 6, and 8. The abutment itself is a platform, which stands close to the mouth of the distributing type-channel, and which in reality is one of the most important elements in this new distributing mechanism, since by its use I am enabled to distribute type without regard to their thickness, and consequently the machine is rendered capable of distributing types of the ordinary fonts, whereas in the old machines, as described in the patents heretofore named, the types had to be cast expressly for the machine, so as to conform to the thirteen different classes of thickness provided for in said machines. Said abutment is shown in Figs. 5, 6, and 8, in the last-named figure in red outlines. It rises to about one-third of the height of the type, and its upper surface is inlaid with hardened steel to prevent it from wearing away by the constant friction of the types to which said surface is exposed.

The lifter $a^4$ is best seen in Figs. 6 and 8. It is situated under the abutment, and it is made in the form of a bell-crank lever, which has its fulcrum on a pivot, $b^4$, and which is so arranged that the tip of the lifter can swing in the direction of the type-channel or in the direction in which the types move in said channel. The tip of the lifter forms a lip or projection, which extends into a notch in the end of the foundation of the type-channel, and which is held in such a position that it extends under the first type in the type-channel to the extent of the thickness of the thinnest type or a little less. A spring, $c^4$, which acts on the tail end of the lifter has a tendency to hold the tip in position, and a set-screw, $d^4$, serves to regulate such position, allowing the tip to project more or less under the first type in the line, and serving to adjust the same from time to time in case it should wear off. The pivot $b^4$ of the lifter is secured to a slide, $e^4$, which moves up and down in a dovetailed groove in the end of the foundation of the type-channel, and is depressed at the proper intervals by a lever, $f^4$, against the action of a spring, $g^4$, which is connected to said slide in such a manner that it has a tendency to carry the same, together with the lifter, upward, and which therefore keeps the tail end of the lever $f^4$ in contact with a cam, $h^4$, on the shaft $h^3$. As this shaft revolves with a uniform velocity, the cam $h^4$ imparts to the lever $f^4$ a regular vibrating motion and the lifter is raised and depressed at the required intervals. As the lifter rises it carries the first type in the line up with it, and as soon as the bottom end of this type has been raised above the edge of the abutment $n^3$ the pressure of the line pushes the same over on the abutment, the next succeeding type being now brought up against the abutment. During this motion the tip of the lifter has to recede in the direction of the arrow marked on it in Fig. 8, which it is capable of doing on account of the spring $c^4$, and as the lifter descends its tip slides down over the side of the second type in the line, and as soon as it descends below the bottom end of said type it springs back to its original position under the type. To effect this motion with absolute surety the lifter descends somewhat lower than the bottom of the type-channel, and as it approaches the lowest point of its stroke its tail end strikes the safety-spring $i^4$, which then acts in conjunction with the spring $c^4$ and causes the lifter to reassume its original position without fail. The safety-spring $i^4$, which is shown in Fig. 8, is requisite, because the spring $c^4$ must necessarily be weak to avoid undue wear and friction as the tip of the lifter slides down on the side of the type, and, since the safety-spring does not come into action until the tip of the lifter has descended below the bottom of the type, it does not increase the friction between said tip and the type.

At or near the mouth of the type-channel G is arranged a series of spring-detents, $j^4$, (see Fig. 4,) which bear on the edges of the last type or types and prevent the lifter from carrying up more than one type at a time. These detents are placed in an irregular or zigzag position, not in line one directly above the other, and thereby their effect is materially increased. They are simple slides inserted into the inner wall of the type-channel, and subjected to the action of springs $k^4$, as shown in Fig. 4, and they are provided with teeth in their inner ends to bear on the type or types and prevent them from rising in the channel before they have passed the detents. Said detents are secured in the end of a vibrating jaw, $h^5$, which forms the end of the inner wall of the type-channel, and which is actuated by a lever, $q^5$, and by a cam on the shaft $h^3$. The motion of this jaw is so timed that it relieves the line of type after the first type has been lifted upon the abutment, and allows said line to move up freely to the abutment. After the feed of the line has taken place the jaw closes and the line of type is held firmly in position. The type, on being lifted upon the abutment $n^3$, bears against the latch or gate $l^4$, which is of a peculiar construction, and will be next described. It consists of a cranked or L-shaped lever, which has its fulcrum on a pivot, $m^4$, Fig. 3, secured in a stud or column that rises from the bed of the machine. Its inner end is turned so that it faces the mouth of the type-channel, and a spring, $n^4$, draws the same up against said mouth. This spring, however, is weak, so that not much force is required to force back the gate, and that the type on being pressed up against the same will not sustain any injury. Said gate is provided with a slot, $o^4$, (see Fig. $4\frac{1}{2}$, Sheet II,) to admit the head of a bolt, $p^4$, and with two lips, $q^4$, which catch under the head of said bolt and between the same and the top of a column, $r^4$, that forms the guide for the bolt, as shown in Figs. 2 and $4\frac{1}{2}$. This bolt is subjected to the action of a spring, $s^4$, which may be inclosed in the column $r^4$, and which has a tendency to depress the bolt and to clamp the lips $q^4$ of the gate between its head and the top of the column. From the bottom of the bolt extends a pin, $t^4$, which catches in a slot in the lever $u^4$. This lever has its fulcrum on a pivot, $v^4$, secured in a bracket that projects from the column, and its loose end, which may be armed with a friction-roller, bears upon a cam, $w^4$, mounted on the shaft $h^3$. This cam is so timed that it raises the lever $u^4$ and bolt $p^4$ just as a type has been lifted on the abutment, and the gate $l^4$, being thus released from the pressure of the bolt, is free to open just far enough to let said type pass. When the gate has been thus opened, and before the pusher $x^4$ takes action, the bolt $p^4$ is allowed to descend and to lock the gate and hold it firmly in position, thus enabling the same to catch and detain the distributing-conveyer at the mouth of the distributing-channel, said distributing-conveyer being provided with a projection, $d^{51}$, Fig. 14, which catches against the gate. By this method of operating the gate the power required to open the same is reduced to the force necessary to overcome the tension of the weak spring $n^4$, and the types, pressing against the gate in opening the same, are not exposed to an undue or injurious strain, and at the same time the gate is locked and firmly held in position as soon as it has been opened the required distance, and the type, on being pushed out into the mouth of the conveyer, is held in the proper position. In order to effect this last-named object with still greater security, the face of the gate is provided with a spring-latch, $y^4$, which turns on a pivot secured in the end of the gate opposite to or in line with the type-channel, and has its free end at a point close to the carrier-wheel and the conveyers attached thereto, as clearly shown in Fig. 4. By these means the channel between the gate and the end of the type-channel, through which the type has to pass in order to reach the conveyer, is made tapering and yielding, so that it holds the type and prevents it from tumbling over as it is pushed out into the conveyer.

The pusher $x^4$, which serves to push the type out into the conveyer, is best seen in Fig. 6. It is a slide which moves in a dovetailed groove in a direction transverse to the type-channel, and terminates in three prongs, so that the requisite room is obtained for the type-levers, and at the same time the end of the pusher, bearing on the type at three points, pushes the same squarely into the conveyer. The pusher is connected by a rod, $z^4$, Figs. 3, 4, and 6, with the upright vibrating lever $a^5$, Fig. 3, which is subjected to the action of a spring that has a tendency to force the pusher in toward the center of the carrier-wheel. On the side of the lever $a^5$ is secured a friction-roller, which, by the action of said spring, is held in contact with a cam, $b^5$, mounted on the shaft $h^3$. By the action of this cam the pusher is forced back against the action of its spring.

With the pusher I have combined a mechanism which I term the "governor," and which is so constructed that when the pusher from some cause fails to act the lifter is prevented from raising another type, and consequently the action of the distributer stops automatically. This governor is best seen in Figs. 6 and 7. It consists principally of a rod, $c^5$, which is inserted into a cavity under the pusher and parallel with the same, and which is subjected to the action of a spring, $d^5$, that has a tendency to force said rod out of its cavity. The outer end of the rod $c^5$ is turned down, so as to form two shoulders, that portion beyond the first shoulder being of such a thickness that it can enter a hook, $e^5$, which projects from the lever $f^4$, that gives motion to the lifter $a^4$; but that portion of the rod $c^5$ which is contained between the two shoulders is of such a thickness that it cannot enter the hook $e^5$. Over this last-named portion of the rod $c^5$ catches a safety-latch, $f^5$, which is operated by the lever $g^5$, that serves to give motion to the jaw $h^5$ at the mouth of the type-channel.

On the lever, $a^5$, which produces the motion of the pusher, is secured a spring-arm, $i^5$, and as the lever $a^5$ advances the spring-arm bears on the end of the rod $c^5$ and pushes the same in, so that the safety-latch $f^5$ catches over the first shoulder and causes said rod to occupy such a position that the hook $e^5$ will freely pass over the thin end of the rod beyond the first shoulder, and consequently the motion of the lever $f^4$ and that of the lifter $a^4$ will not be interfered with. After the hook $e^5$ has freely passed over the end of the rod $c^5$ the safety-latch is raised by the action of the lever $g^5$, and said rod is free to follow the action of its spring until its first shoulder strikes the hook $e^5$; but if from some cause the pusher fails to act, and consequently the spring-arm $i^5$ does not press back the rod $c$, the latch $f^5$ is lifted clear of the second shoulder of said rod, and this release takes place just at the moment the hook $e^5$ occupies its highest position so that the rod $c^5$ will fly out by the action of the spring $d^5$, causing that part between the first and second shoulder to come under the hook $e^5$. This part not being able to enter the hook retains the same, and with it the lever $f^4$, in such a position that the cam $h^4$ takes no action on said lever, and consequently the lifter is not raised, and no new type is brought on the abutment $n^3$ before the pusher has pushed off the first type already on said abutment. As soon as the pusher acts again, so that the rod $c^5$ is pushed back in its cavity, the safety-latch resumes its action and prevents said rod flying out to such a position that it stops the motion of the lever $f^4$. By these means an automatic stop-motion for the lifter is obtained, and if the pusher fails from some cause to push a type off from the abutment $n^3$, no second type will be raised until the first has been actually pushed off.

It now remains to describe the type-setting mechanism, and particularly the composition type-channel with its various attachments for receiving the type from the setting-conveyers.

The composition type-channel E is best seen in Figs. 1, 19, and 20. Unlike the type-channel described in the patents of Timothy Alden and that of Henry W. Alden and Wm. Mackey, my type-channel, instead of being rigid, is arranged in such a manner that it assumes a vibrating motion as the operation of setting proceeds. It turns on a pivot, $j^5$, (see Fig. 1,) and it terminates just over the center of this pivot, so that the type, on passing from the composition-channel into the transfer-channel N, has the least possible motion and is not liable to catch or clog up the channel. The end of the composition-channel is rounded off, so that it does not interfere with the vibrating motion of the channel, and the transfer-channel N is supported by an arm or bracket, which may be connected to or independent of the bed A. Said transfer-channel may be made removable, so that it can be readily taken off; or it may be rigidly connected to the machine, and it may be of any convenient length, in one or more sections. As the line of type is pushed along in the transfer-channel the types are liable to rise and place themselves in an uneven position, so that it is difficult to read the line. I have therefore provided a tool, O, (see Fig. 24, Sheet I,) which consists of a roller with a broad flange running on a pivot, which is secured in a suitable handle. By passing this roller over the type the line becomes even and the operator is enabled to read the same with ease. The flange of the roller forms a guide to prevent said roller from running off the line.

The motion of the type through the composition-channel is facilitated by means of one or more rows of revolving pressure-shot, $k^5$, which are secured in cavities in the side wall of the channel, as seen in Fig. 19. Behind the shot are placed small plates or washers and springs, which press the shot in toward the channel. To prevent the shot from passing into the channel the cavities are a little contracted at their inner ends, which is effected by boring holes from the outside and stopping before the drill has passed clear through. A plate, $l^5$, closes up the holes on the outside of the type-channel. In practice two rows of pressure-shot are used, which are placed in a zigzag position, so that the type are prevented from falling between the shot. By these means a very effective anti-friction surface is created.

The vibrating motion of the type-channel is produced by the combined action of a cam, $m^5$, and a spring, $n^5$. The cam acts on a friction-roller, $o^5$, which is secured to the under surface of the type-channel and which is held in contact with the working-surface of the cam by the spring, one end of which is fastened to the channel and its other end to the rail H or to any other fixed portion of the machine. The cam $m^5$ is mounted on a vertical shaft, $o^{51}$, to which a revolving motion is imparted by suitable gear-wheels from the driving-shaft of the machine. On the same shaft are mounted two other cams, $p^5$ and $q^5$. The cam $q^5$ acts on a vibrating rod, $r^5$, which is hinged at one end to the rail H or any other fixed portion of the machine, and at its other end it connects with the plunger-slide $s^5$. This plunger-slide is attached to the outside wall of the channel by screws $t^5$, which pass through slots in the slide, as shown in Fig. 20, and a spring, $u^5$, serves to keep said slide at the forward end of its stroke or to press the friction-roller which is attached to the vibrating rod $r^5$ up against the working-surface of the cam $q^5$. The plunger $v^5$ is connected to its slide by a pivot, $w^5$, and it is provided with an oblong slot that catches over a stud, $x^5$, which rises from the bed of the machine. If the cam $q^5$ acts on the slide $s^5$, the plunger is forced in, and the motion of said cam is so timed that it causes the plunger to move in at the moment the channel has swung out; but as the channel swings in toward the carrier-wheel the plunger is at the extreme end of its stroke, clear of the mouth of the channel, and it is retained by the stud $x^5$, so that it leaves the mouth of the channel unobstructed and free to receive the type from the setting-conveyers.

The mouth of the channel E is provided with two jaws, $y^5 y^{5*}$, one or both of which are made movable. In the drawings the jaw $y^{5*}$ is represented as being stationary, while the jaw $y^5$ is movable. It is firmly secured to a pivot, $z^5$, which passes through the outer wall of the channel E and turns in its bearings in said wall. To the lower end of said pivot is secured a crank, $a^6$, the wrist-pin of which catches in a loop at the end of a lever, $b^6$, which has its fulcrum on a pivot secured to the under side of the channel E, and to which a vibrating motion is imparted by the action of the cam $p^5$ on the shaft $o^5$. This cam is so timed that it opens the jaw as the channel moves toward the carrier-wheel, and as soon as the channel has taken a type from one of the setting-conveyers the jaw closes down on it with great force by the combined action of the springs $c^6$ and $d^6$. The springs $c^6$ press continually on the jaw, but they are weak and have just power enough to retain the type without subjecting it to a great pressure; but the spring $d^6$ comes into action only at certain intervals. It is situated under the type-channel and secured to the rail H or any other fixed portion of the machine, and it bears on a pin, $e^6$, which projects from the crank $a^6$. As the type-channel moves in toward the carrier-wheel the spring $d^6$ is strained, and after the cam $p^5$ releases the lever $b^6$ the jaw $y^5$ closes with considerable pressure, and the type received between the jaws is firmly retained and prevented from being carried out by the action of the conveyer. As the type-channel swings back away from the carrier-wheel the tension of the spring $d^6$ gradually relaxes, and by the time the type-channel has reached the extreme end of its stroke the tension of the spring $d^6$ is completely exhausted, and the jaw $y^5$ retains the type simply by the power of the weak springs $c^6$, so that the plunger is enabled to carry the type into the channel with little pressure and without producing an injurious strain on the type.

To prevent the type in the channel from tumbling over when the main jaw $y^5$ opens a secondary jaw, $f^6$, must be applied. This jaw is situated within the jaw $y^5$, and it turns on the pivot $z^5$, being subjected to the action of a spring, $g^6$, Fig. 19. Its end is of such a shape that it permits the type to enter, and it is provided with a small nose or shoulder, which catches over the edge of the type and prevents it from tumbling over when the plunger recedes and when the main jaw $y^5$ is thrown open.

The surplus-channel I is also provided with movable jaws $h^6$, as seen in Figs. 1 and 4. These jaws, however, are detached from the channel, and they swing on a pivot, $i^6$, which is secured in a standard, $j^6$, that rises from the bed or from the rail H or from any fixed part of the machine. Each jaw is detached from the other, and the inner jaw is provided with prongs projecting beyond the outer jaw, so that said prongs are capable of catching into the distributing-conveyers behind the type contained therein. By this action the jaw, with the projecting prongs, opens and the type is admitted between said jaws and held there by the action of a spring, $k^6$. The jaws are then made to swing back in line with the channel I, and a hook-shaped pusher, $l^6$, catches behind the type held in said jaws and pulls the same out of the jaws and into the channel. To prevent the type from passing into the jaws any farther than desirable one of the jaws is provided on its inner surface with projections, as clearly shown in Figs. 1 and 4 of the drawings. The motion of the jaws and of the hook-shaped pusher is produced by suitable cams mounted on the vertical shaft $m^6$, and requires no further explanation, being substantially the same as that of the corresponding parts of the oscillating composition type-channel.

The keys L, which serve to give the required indication to the setting-conveyers, are secured in the key-board L', which is made with two or more steps, as shown in Fig. 21. By this construction of the key-board I am enabled to arrange the keys in such a relative position that the operator is enabled to distinguish the same with comparatively little practice. The keys, however, do not act directly upon the setting-conveyers; but they act upon an independent registering apparatus, which is fully described in the patent of Timothy Alden, and which I have not represented in detail in my drawings.

What I claim as new, and desire to secure by Letters Patent, is—

1. The arrangement of an adjustable manuscript supporter or desk, C, on the central arbor, $a$, of the carrier-wheel B, substantially as and for the purpose set forth.

2. The adjustable rule and weight $e$, suspended from cords $f$, which wind on the friction-arbor $g$, in combination with the desk C, substantially as described.

3. Constructing the carrier-wheel B of two concentric rings, $m$ and $k$, substantially as and for the purpose described.

4. The protecting-flange $r$ on the central ring, $m$, of the carrier-wheel, to prevent the fulcrum-pins of the conveyers from working out, as described.

5. The friction steady-rollers $u$, bearing on the inner edge of the lower ring, $l$, of the carrier-wheel, substantially as and for the purpose set forth.

6. The gallery K under the outer ends of the radiating type-cases D, substantially as and for the purpose described.

7. The lever $d^{12}$ on the conveyers $p$ $q$, in combination with the cams $d^{14}$, to pull said conveyers back out of the excavations in the ring F, substantially as set forth.

8. The hook $z$, projecting from the gripper-jaw $w$ of the setting-conveyers and catching in the serrated rail $v$ to open the gripper, substantially as described.

9. The projections $v^{41}$ on the inner ends of the plates of the cases D, to act in connection with the distributing-conveyers, substantially as and for the purpose set forth.

10. The cam $c'$ on the rail H, acting on the rollers $b'$ of the setting-conveyers, substantially as and for the purpose set forth.

11. The segmental flange or projection $d'$, cast solid with the foundation J of the radiating type-cases D, and provided with recesses to sustain said cases, substantially as described.

12. The lip $t'$ on the pusher $e'$, to prevent the type in the type-cases from rising, substantially as described.

13. The projections $f^2$ on the type-cases, to prevent the pusher from rising, substantially as set forth.

14. The projections $c^2$ on the pusher $e'$, to act on the levers $a^2$ $b^2$, substantially as and for the purpose described.

15. Giving to the tilting levers $u'$ under the type-cases D a double fulcrum, substantially as and for the purpose described.

16. The latch $x^2$ at the inner end of the distributing-galley gage $g^2$, substantially as and for the purpose described.

17. The adjustable shield $z^2$ on the distributing type-channel G, substantially as and for the purpose described.

18. The roller-breaker $a^3$, in combination with a cavity in the bottom of the type-channel G, substantially as and for the purpose described.

19. Making the movable floor $p^2$ with a serrated, inclined, or curved edge, substantially as and for the purpose set forth.

20. The latch $w^2$ at the head of the distributing-galley, substantially as and for the purpose set forth.

21. The alarm arrangement on the distributing-galley, consisting of the pin $r^2$, spring-arm $s^2$, rock-shaft $t^2$, and alarm-click $u^2$, or equivalent devices, as described.

22. The oscillating breaker $d^3$ in one wall of the type-channel and opposite a cavity in the other wall, substantially as and for the purpose set forth.

23. The false yielding channel-piece $f^3$, in combination with the cavity opposite the breaker $d^3$, substantially as and for the purpose described.

24. The oblique slot $m^{31}$ for the purpose of adjusting the roller $m^3$ in relation to the type-channel G, substantially as described.

25. The method herein described of separating the first type in the distributing type-channel from the line, consisting of the abutment $n^3$ and lifter $a^4$, substantially as set forth.

26. The spring-detents $j^4$, arranged in regular or zigzag position near the mouth of the distributing type-channel, to prevent more than one type being lifted on the abutment, substantially as described.

27. The self-adjusting gate $l^4$, arranged to open freely and then be locked by the lever $u^4$ and bolt $p^4$, substantially as set forth.

28. The latch $y^4$ at the end of the gate $l^4$, substantially as and for the purpose described.

29. The vibratory lifter $a^4$, to take hold of the type and raise it on the abutment $n^3$, substantially as set forth.

30. The additional spring $i^4$, to carry the lifter back under the type, substantially as set forth.

31. The mechanism which I term the "governor," consisting of the rod $c^5$, hook $e^5$, latch $f^5$, and spring-arm $i^5$, to stop the motion of the lifter if the type on the abutment $n^3$ is not pushed off, substantially as described.

32. The cam $v^3$ and levers $u^3\ t^3$, to throw the type-levers $z^3$ out of the nicks of the type by a positive action, substantially as set forth.

33. Giving to the composition type-channel E a vibrating motion toward and from the carrier-wheel B, substantially as and for the purpose described.

34. Ending the channel E directly over the center of its fulcrum-pin to allow the last type passing out with the least possible motion, as set forth.

35. The arrangement of the transfer-channel N, in combination with the composition type-channel E, substantially as and for the purpose described.

36. The flanged roller-leveler $o$, in combination with the transfer-channel N, substantially as and for the purpose set forth.

37. The revolving pressure-shot $k^5$ in the type-channel E, substantially as and for the purpose described.

38. The combination of a movable jaw, $y^5$, with the vibrating type-channel E, substantially as and for the purpose set forth.

39. The plunger $v^5$, having both a vibrating and a reciprocating motion independent of the vibrating motion of the channel E, and operating in combination with said channel, substantially as and for the purpose described.

40. The spring $d^6$, in combination with spring $c^6$, made to close the movable jaw $y^5$ with the requisite force upon the type and to release said jaw at the proper intervals.

JNO. T. SLINGERLAND.

Witnesses:
   RANSOM LAMB,
   GUSTAV BERG.